March 6, 1956 W. M. VENNER ET AL 2,737,428
TRUNK PISTON
Filed Oct. 18, 1952
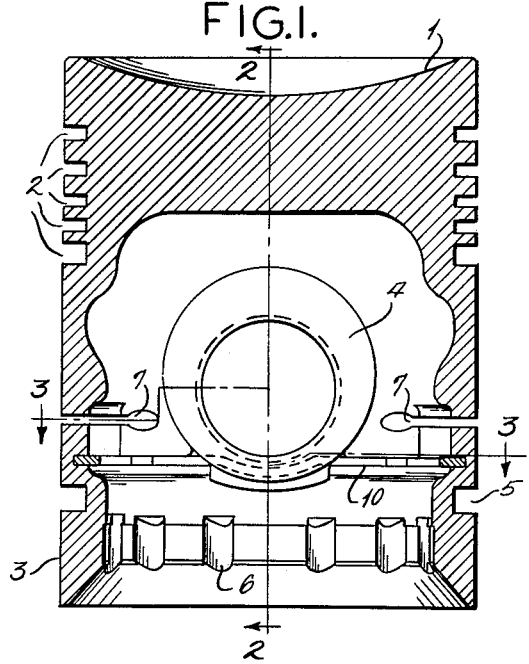
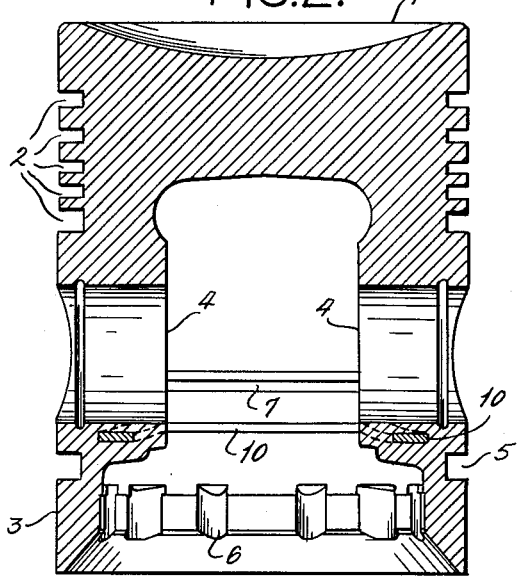
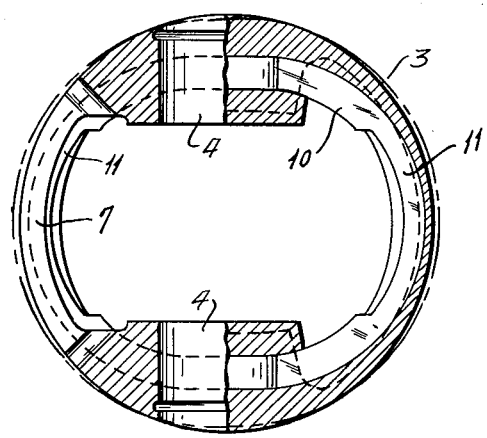
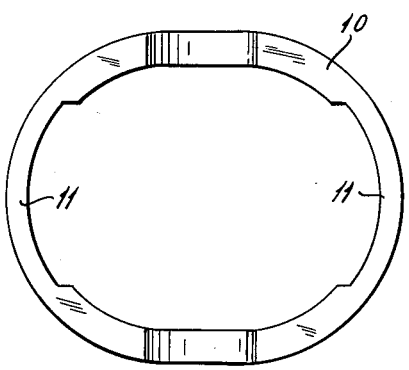
INVENTORS:
WILLIAM M. VENNER
PERCY L. BOWSER JR.
WILLIAM F. PETERSON
By Bruninga & Sutherland
ATTORNEYS.

United States Patent Office 2,737,428
Patented Mar. 6, 1956

2,737,428
TRUNK PISTON

William M. Venner, Clayton, Percy L. Bowser, Jr., Ladue, and William F. Peterson, Creve Coeur, Mo.; said Venner and said Bowser, Jr., assignors to Sterling Aluminum Products, Inc., St. Louis, Mo., a corporation of Missouri Application October 18, 1952, Serial No. 315,520

4 Claims. (Cl. 309—13)

This invention relates to trunk pistons, particularly of a type designed for use in internal combustion engines for automobiles. Such pistons are usually constructed of a metal of relatively high thermal expansion, such as aluminum and magnesium alloys containing various alloying elements such as copper, silicon, nickel, manganese, etc. Where silicon is employed on the order of 12%, the thermal expansion is materially reduced. Copper, nickel and manganese impart hardness and strength to the alloy.

The temperatures encountered in internal combustion engines are, however, high, so that there is liability of seizure when hot and a looseness when cold.

This invention applies to trunk pistons of the heavy-duty type adapted particularly for use in Diesel engines, although as to some features, this invention is applicable to aircraft engines. Such a piston comprises a head of relatively heavy vertical depth provided with packing grooves and a skirt which is provided with wrist pin bosses. The top of the piston must be given considerable clearance as compared with automobile engines, thus the clearance is on the order of 0.20 inch. This requires that the bottom of the piston fit rather close in order to hold the top in alignment and reduce the piston slap until the piston comes up to working temperature. While the bottom of the piston is at the lowest temperature, still seizure is liable to take place unless special means are provided. Vertical slotting will not solve this problem, and that will weaken the piston which must be strong.

One of the objects of this invention is to provide a piston of the type described whereby its expansion at its lower end may be controlled so as to maintain a close fit in the cylinder, whether the piston be hot or cold.

Further objects will appear from the detailed description in which will be set out an illustrative embodiment of this invention. It is to be understood, however, that this invention is susceptible of various embodiments within the scope of the appended claims.

Referring to the accompanying drawing:

Fig. 1 is a vertical section of a piston embodying this invention;

Fig. 2 is a section along line 2—2 of Fig. 1;

Fig. 3 is a section along line 3—3 of Fig. 1; and

Fig. 4 is a detail of the control ring.

Generally stated, in accordance with an illustrative embodiment of this invention, a trunk piston of an aluminum alloy comprising a head, a skirt provided with wrist pin bosses and with thrust faces, has the lower part thereof axially separated from the part above it circumferentially in one or both thrust face regions, and a ferrous ring lying within and extending completely around the skirt below the separation is surrounded and anchored by the alloy in the boss regions, but has its inner part or parts exposed circumferentially and radially along the separated thrust face region or regions.

Referring now to the accompanying drawings, 1 designates a head of rather extended depth provided with packing ring grooves 2 at the top. A skirt 3 is provided with wrist pin bosses 4 and may be provided at its bottom with a packing ring groove 5. Balancing lug 6 may also be provided.

In accordance with this invention, one or both of the thrust faces is provided with a slot or slots 7 in one or both regions of the thrust faces. The slot is located generally on the level with the bosses, and more specifically below the center line of the bosses. A control element or ring 10 of a ferrous metal, that is, one having a coefficient of expansion about that of the cylinder in which the aluminum alloy piston works, is imbedded in the alloy below but contiguous to the slot or slots 7, and more specifically below the bosses. This ring is, however, exposed circumferentially and axially in the regions of the thrust faces, although it may be partially imbedded therein as shown in Fig. 1 where however the inside parts of the ring extend inwardly beyond the alloy. The ring may be reduced in radial depth to provide a part or parts 11 which in the embodiment shown each encompass an angle of about 30°. The ring may be made of cold rolled steel, although it may be made of one of the steel alloys having a coefficient of expansion approaching zero. Such steels have heretofore been employed in strut pistons. However, cold rolled steel serves the purpose. The centers of the rings may be dished slightly as shown in Figs. 1 and 4, to not run into the wrist pin receiving bearings in the bosses.

The making of a piston of this type is usually carried out in permanent molds of iron or steel having outside mold parts and a multipiece core. The control ring is placed on the core when collapsed in recesses provided therein in order to position this ring properly. The core is then expanded, the mold closed, and the metal cast therein. At that time, the slot or slots 7 are not formed and neither are the packing grooves 2 and 5.

After the piston has been cast, the parts will be in the position shown in full lines in Fig. 3. Upon cooling from molten to cool condition, the alloy will shrink much faster than will the steel ring, so that the piston metal will finally arrive at a condition of tension. In so doing, the steel is placed under compression radially as well as circumferentially. When now the circumferential slot or slots 7 is or are cut, the steel and the piston will both move out so as to form an oval contour as shown in dotted lines in Fig. 3, because the strain is partially relieved in the region or regions of the thrust faces and particularly because sectors 11 at those faces are reduced in radial depth. It will of course be understood that the oval is exaggerated for illustrative purposes, because the actual distortion is small. The piston is now machined to size, with a skirt of the usual round or oval contour. If oval, it has its major diameter on the thrust face axis and its minor diameter on the wrist pin axis. The steel ring will, however, remain oval (slightly) until in use in the engine; until then, the piston metal will remain partially under tension while the ring will remain partially under compression.

The drawings illustrate a piston of actual proportions for use. In such a piston having a diameter of 4.75" and a length of 6.125", with the slots 7.2" above the bottom of the piston, the piston above the slots 7 is given a clearance of 0.020" while below the slots it is given 0.002". The above dimensions are, of course, simply for illustrative purposes.

A piston of the construction described and made as described can be made with a very low clearance below the slots 7, and it will maintain a close fit in that zone when hot or cold. That is for the following reason: As the piston heats up, the skirt above the slots 7 will of course expand radially in all directions. Such radial expansion will, however, be transmitted to the skirt below the slots only in the regions of the bosses. That will tend to relieve some of the strain along the wrist pin axis so that the piston metal and the steel ring will move out along that axis. That will cause the steel ring to tend to return to its original form. In so doing, the strain on the piston metal at the thrust faces is also relieved so as to move in with the steel ring at those faces. In the boss regions the ring is fully anchored because the metal is cast entirely there-around. Because of the construction of the ring, it takes generally the form of cantilevers anchored in the boss regions and extending into the thrust face regions. The piston metal does not, however, surround the sectors 11 but only lies against the outside faces thereof and in the particular embodiment shown, only partially against the radially reduced parts 11. As the piston metal solidifies on the control ring, it will shrink upon the ring in the regions of the bosses, see Figure 2, because the piston metal entirely surrounds the ring in that region. At the thrust faces, however, Figure 1, the inner parts of the ring are left exposed circumferentially and part axially so that they will not be fully imbedded. The control ring at the thrust face or faces and the alloys are under stress when the piston is cold, which stress will be progressively relieved as the piston heats up in the engine. The skirt at the thrust faces in the zone below the slots 7 will therefore remain accurately dimensioned diametrically.

It will therefore be seen that the invention accomplishes its objects. A piston is provided which can be closely fitted to a cylinder of an internal combustion engine, viz., diesel engine, and which will maintain its dimensions at the bottom of the skirt from hot to cold so that there will be no seizing when hot and no slapping when cold, even with the small clearance provided below the slots 7. By slotting the piston generally on the level with the bosses and specifically below the center line of the bosses, the strength of the piston above the slots will not be detracted from, nor will its heat conductivity.

Having thus described the invention, what is claimed and desired to be secured by Letters Patent is:

1. A heavy duty trunk piston of an aluminum alloy, comprising, a head of extended length, a skirt provided with wrist pin bosses and with thrust faces, the lower part of the skirt being axially separated from the part above it generally on the level with said bosses by a slot extending circumferentially in a thrust face, and a ferrous ring lying within and extending completely around the skirt below and contiguous to said separation, surrounded and anchored by the alloy in the boss regions but having its inner part exposed circumferentially and axially along the separated thrust face, said control ring at the thrust face and the alloy thereover being under stress when the piston is cold, which stress is progressively relieved as the piston heats up in the engine, adapted to maintain the skirt dimension diametrically.

2. A heavy duty trunk piston of an aluminum alloy, comprising, a head of extended length, a skirt provided with wrist pin bosses and with thrust faces, the lower part of the skirt being axially separated from the part above it generally on the level with said bosses by slots extending circumferentially in the thrust face regions, and a ferrous ring lying within and extending completely around the skirt below and contiguous to said separations, surrounded and anchored by the alloy in the boss regions but having its inner parts exposed circumferentially and axially along the separated thrust faces, said control ring at the thrust faces and the alloy thereover being under stress when the piston is cold, which stress is progressively relieved as the piston heats up in the engine, adapted to maintain the skirt dimension diametrically.

3. A heavy duty trunk piston of an aluminum alloy, comprising, a head of extended length, a skirt provided with wrist pin bosses and with thrust faces, the lower part of the skirt being axially separated from the part above it substantially below the center line of the bosses by a slot extending circumferentially in a thrust face region, and a ferrous ring lying within and extending completely around the skirt below and contiguous to said separation, surrounded and anchored by the alloy in the boss regions but having its inner part exposed circumferentially and axially along the separated thrust face, said control ring at the thrust face and the alloy thereover being under stress when the piston is cold, which stress is progressively relieved as the piston heats up in the engine, adapted to maintain the skirt dimension diametrically.

4. A heavy duty trunk piston of an aluminum alloy, comprising, a head of extended length, a skirt provided with wrist pin bosses and with thrust faces, the lower part of the skirt having a packing groove and being axially separated in a zone between said groove and below the center line of the bosses by a slot extending circumferentially in a thrust face, and a ferrous ring lying within and extending completely around the skirt below and contiguous to said separation, surrounded and anchored by the alloy in the boss regions but having its inner part exposed circumferentially and axially along the separated thrust face, said control ring at the thrust face and the alloy thereover being under stress when the piston is cold, which stress is progressively relieved as the piston heats up in the engine, adapted to maintain the skirt dimension diametrically.

References Cited in the file of this patent

UNITED STATES PATENTS

| 1,469,087 | Hewitt | Sept. 25, 1923 |
| 1,548,885 | Hughes | Aug. 11, 1925 |
| 1,736,001 | Flammang et al. | Nov. 19, 1929 |
| 1,874,925 | Diamond | Aug. 30, 1932 |
| 2,221,535 | Berry | Nov. 12, 1940 |
| 2,309,555 | Venner et al. | Jan. 26, 1943 |
| 2,394,241 | Howlett | Feb. 5, 1946 |